(12) United States Patent
Preswick et al.

(10) Patent No.: X9032
(45) Date of Patent: Aug. 17, 1835

(54) OIL OF HAZZE, PREPARATION OF

(76) Inventors: Christopher Preswick; John Nicholas Fisher

Christopher Preswick, & John Nicholas Fisher

Letters Patent.

The Schedule referred to in these Letters Patent and making a part of the same, containing a description in the words of the said Christopher Preswick and John Nicholas Fisher themselves of their improvement. In the preparation of the oil of Harze.

To all to whom these presents shall come.

Be it known that we Christopher Preswick and John Nicholas Fisher of the City and County of New York, have invented a new and useful improvement being the preparation of the Oil of Harze, and that the following is a full and exact description thereof. The object of our invention is to prepare an essential Oil from the condensible matter or overflow which is obtained in the manufacture of Carburetted Hydrogen Gas from rosin, woods or bituminous coal or a mixture of them, and the said oil may be applied to the following purposes, that is to say. In the preparations of paints, varnishes & Lacquers, also as a solvent for Caoutchouc (or gum elastic) also for furnishing light in lamps. The description of the preparation of the said oil is as follows viz. Mix the condensible matter or overflow produced in the manufacture of carburetted hydrogen gas with a portion of animal or vegetable charcoal (the former is preferable) and submit this mixture to distillation in retorts of Metal, glass or earthenware, of ordinary construction, and by condensation we produce the Oil above mentioned, which is applied to the aforesaid purposes either with or without rectification. What we claim as our own invention, and not previously known in the above described improvement, is the preparation of an essential Oil, called Harze, from the condensible matter or overflow which is obtained in the manufacture of Carburetted Hydrogen Gas from rosin Woods or bituminous coal, or a mixture of them by retorts

United States Patent

Patent No.: X9032 retorts of metal, glass, or earthenware so as to produce the oil, a specimen of which, with its ingredients are deposited in the Patent Office conformably to law.

Witnesses

Exd. Henry Co Peswick — Christopher Prewick

W.G. William Sullivan — John Nicholas Fisher (363 words)